United States Patent [19]

Waggamon et al.

[11] Patent Number: 5,384,495
[45] Date of Patent: Jan. 24, 1995

[54] WIRING ERROR DETECTOR FOR DOOR OPERATOR

[75] Inventors: Dennis W. Waggamon, North Canton; Louis G. Whitaker, Alliance, both of Ohio

[73] Assignee: GMI Holdings, Inc., Alliance, Ohio

[21] Appl. No.: 164,307

[22] Filed: Dec. 8, 1993

Related U.S. Application Data

[63] Continuation of Ser. No. 649,553, Feb. 1, 1991, abandoned.

[51] Int. Cl.6 .................. E05F 15/10; E05F 15/20; H02H 7/08
[52] U.S. Cl. ........................ 307/326; 49/28; 318/286
[58] Field of Search ........... 318/265, 266, 282, 286; 361/84, 90; 307/116, 140, 117, 127, 326, 328; 49/25-28; 340/650-652, 661-663

[56] References Cited

U.S. PATENT DOCUMENTS

| | | |
|---|---|---|
| 3,742,222 | 6/1973 | Endl . |
| 3,854,089 | 12/1974 | Emler .................. 340/663 |
| 4,304,375 | 12/1981 | Builta et al. ............ 244/17.13 |
| 4,386,398 | 5/1983 | Matsuoka et al. ............ 49/28 |
| 4,449,080 | 5/1984 | Konrad et al. ............ 361/90 |
| 4,758,837 | 7/1988 | Fruhwald ............ 340/652 |
| 4,764,759 | 8/1988 | Braun et al. ............ 340/652 |
| 4,916,570 | 4/1990 | Dale ............ 361/90 |
| 4,962,350 | 10/1990 | Fukuda ............ 361/90 X |
| 5,029,278 | 7/1991 | Topmiller ............ 340/652 |

FOREIGN PATENT DOCUMENTS

| | | | |
|---|---|---|---|
| 0911020 | 9/1972 | Canada ............ | 307/326 |
| 0370828 | 5/1990 | European Pat. Off. . | |
| 9006605 | 9/1990 | Germany . | |

*Primary Examiner*—A. D. Pellinen
*Assistant Examiner*—Fritz M. Fleming
*Attorney, Agent, or Firm*—Rankin, Hudak & Hill

[57] ABSTRACT

A door operation control system has a door opening for moving a door between open and closed positions. A door operator control circuit selectively operates the drive means to move the door between the open and closed positions. An obstruction detection device detects whether there is an obstruction in the path of the door between the open and closed positions and generates a signal in response thereto. The obstruction detection device is connected to the control circuit by wiring to permit operation of the door opener in the absence of a signal from the obstruction detection device and to prevent certain operations of the door opener in the presence of a signal from the obstruction detection device. An error detection circuit detects faults or errors in the wiring and generates a signal to prevent certain operations of the door operator when the faults or errors are detected. The error detection circuit prevents unsafe operation of the door opener if a wiring error has made the obstruction detection device inoperative.

9 Claims, 2 Drawing Sheets

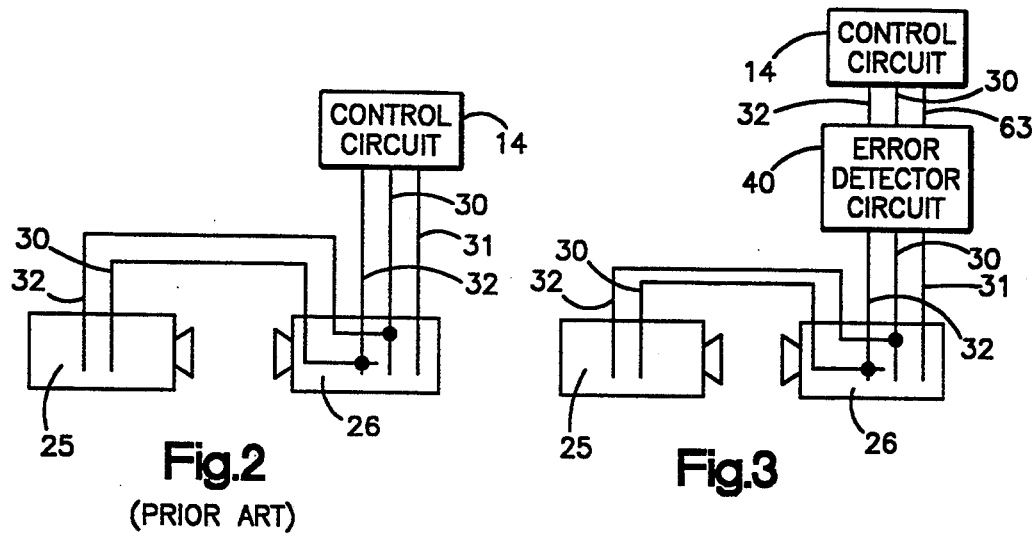
Fig.2 (PRIOR ART)
Fig.3
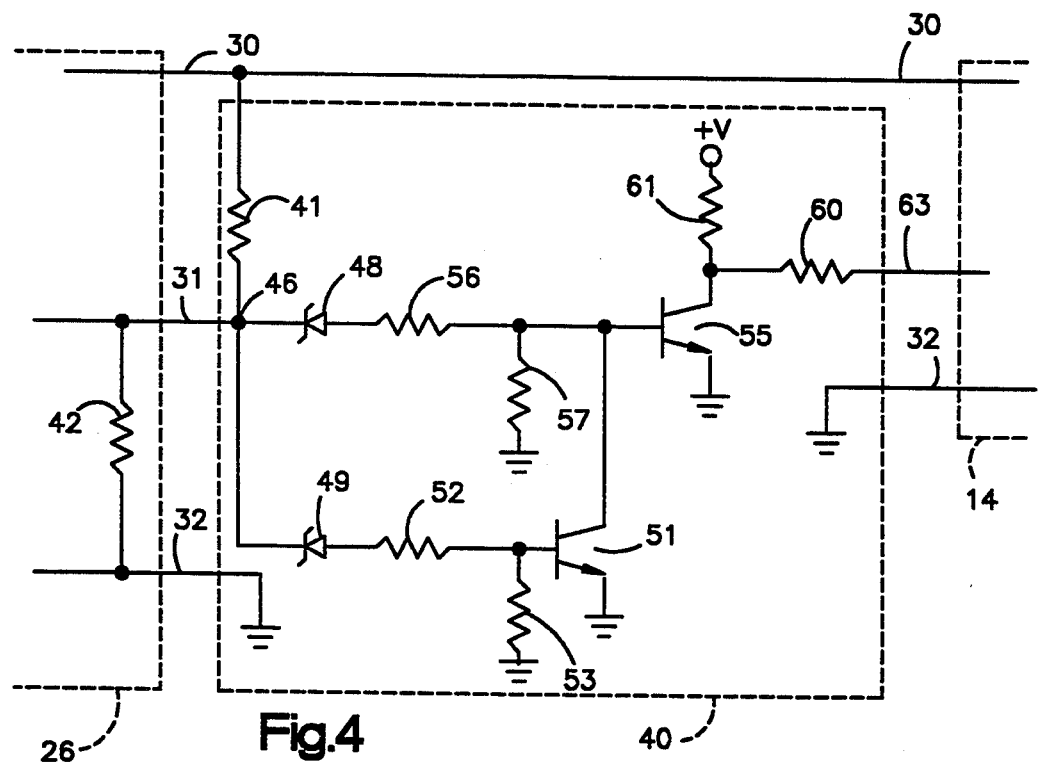
Fig.4
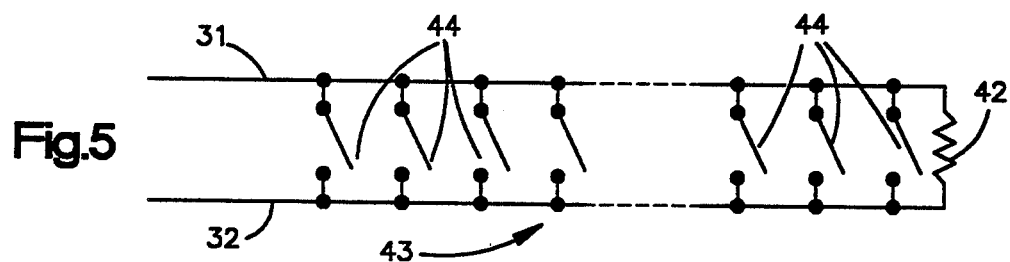
Fig.5

WIRING ERROR DETECTOR FOR DOOR OPERATOR

This is a continuation of application Ser. No. 07/649,533, filed Feb. 1, 1991.

BACKGROUND OF THE INVENTION

1. Field of the Invention

This invention relates to automatic door operators, and more particularly to door openers having obstruction detection devices.

2. Description of the Prior Art

There have been various types of obstruction detection devices for use in garage door operators. Most garage door operators have for many years typically included a torque sensing device as a part of the door operator. The sensing device detected whether excess torque was being used to close the garage door. Since such excess torque would probably be caused by the door attempting to close upon an obstruction that was in the path of the door, the door operator stopped and reversed the door when this excess torque was detected.

While such torque detectors were generally effective, they only worked after the door had actually encountered the obstruction, and they did not provide a means for detecting obstructions before the door has exerted excessive force on the obstruction.

Recently, increased attention has been paid to residential garage door operator safety. Legislation has been passed in several states, including Minnesota and California, and there is pending federal legislation. The purpose of this legislation is to provide additional safety features to residential garage door operators beyond the traditional torque sensing devices, so that the door does not strike obstructions that are in the path of the door. The California law requires the inclusion of a tactile garage door edge sensor, an optical sensor or similar device that, when activated, is designed to cause a closing door to open and prevent an open door from closing.

This legislation thus mandates the inclusion of an obstruction detection device for residential garage door openers that will detect the presence of an obstruction before the door applies excessive force to the obstruction and that will be connected to the door operator so that the operator takes appropriate control of the door closing when an obstruction is detected. The two most widely used obstruction detection devices of this type are edge sensors and optical or light beam sensors.

Edge sensors have been commonly used in one form for many years on elevator doors, and edge sensors have also been specifically designed for use on the bottom edge of garage doors. An electrical edge sensor device typically comprises a strip placed along the leading edge of the garage door providing a multiplicity of parallel open switches spaced along the door edge. When a small amount of pressure is applied to any spot in the door, one or more of the switches closes, producing a closed circuit. Edge sensors thus provide an open-circuit or high-level signal when no obstruction is sensed and provide a closed-circuit or low-level signal when an obstruction contacts the sensor.

Optical beam sensors work by providing a light beam across the doorway and sensing if this beam is broken by the presence of an obstruction. An optical beam sensing device typically include a infrared light emitter positioned on one side of the garage doorway and an infrared light sensor on the other side. The emitter produces a light beam that is aligned so that it extends across the doorway and strikes the light sensor on the other side. As long as the sensor detects the light beam, the sensor produces a low-level output signal to the door operator. When the light beam is broken and the sensor does not detect the presence of the beam, the sensor produces a high-level output signal indicating the presence of an obstruction in the doorway.

These obstruction detection devices are typically electrically connected to the door operator by three wires or lines: a supply line, a ground line and a signal line. The supply line typically provides a voltage supply of 20 to 30 volts from the power supply of the door operator to the remote obstruction detection device. The ground line supplies a reference ground signal from the door operator to the obstruction detection device. The signal line carries the output signal from the obstruction detection device to the door operator indicating the presence or absence of an obstruction. The voltage on the signal line is close to the supply voltage when the obstruction senses an obstruction and is close to ground when no obstruction is sensed.

As long as the door operator receives a low-level output signal from the obstruction detection device on the signal line, the operator operates the door in a normal sequence, opening and closing the door. When the door operator receives a high-level output signal from the obstruction detection device on the signal line, this is an indication that an obstruction has been detected, and the door operator alters the normal sequence of operation by stopping and reversing the door if it is closing. (If the door is already opening when an obstruction is detected, the operator continues opening the door without interruption. ) As long as an obstruction continues to be sensed by the obstruction detection device, a high-level output signal continues to be present on the signal line, and the operator will not permit the door to close.

These external obstruction detection devices are generally very effective in sensing an obstruction so that the door operator takes the appropriate action in response. However, the obstruction detection devices are only effective as long as they operate and as long as the wiring between the door operator and the detection device is in proper operating condition. If one of the wires between the obstruction detection device and the door operator breaks or is damaged or if the wires short out, the perceived signal from the obstruction detection device will be unreliable. If certain wires short or open, the signal line will contain a high-level signal which will cause the door operator to keep the door open. However, if certain other conditions occur, it is possible for the door operator to continue to sense a low-level signal on the signal line even though there is an obstruction in the doorway.

For example, if the supply line and the signal line short together, a high-level signal will be present on the signal line regardless of the presence of an obstruction. If the signal line and the ground line short together, a low-level signal will be present on the signal line regardless of the presence of an obstruction. If the supply line or the signal line is damaged creating an open circuit on either line, a low-level signal will be present on the signal line regardless of the presence of an obstruction. Similarly, if the ground line is damaged creating an open circuit on that line, a high-level signal will be present on the ground line regardless of the presence of an obstruction.

SUMMARY OF THE INVENTION

The present invention overcomes the potential problems inherent in the prior art and provides a means for automatically checking if there is an error or fault in the wiring connecting the remote obstruction detection device with the garage door operator. The circuit of the present invention causes the operator to keep the door in the safe position until the error or fault is corrected and the wiring is repaired.

The present invention provides a circuit placed in the return signal line between the output of the obstruction detection device output and the input of the door operator. The circuit of the present invention senses whether there is an inadvertent short or open circuit in any of the three lines and causes the resulting signal to always be a high-level signal if there is a short or open circuit, so that the door operator will open a closing door or will keep an open door from closing.

The circuit of this invention thus causes the door safety sequence to be actuated if an interconnect wire opens or if an interconnect wire shorts, as well as when an obstruction is detected.

The circuit of the present invention is device independent and can be used with any type of obstruction detection device, including infrared optical sensing devices, edge sensing devices and other devices presently available as well as devices yet to be developed. The circuit of the present invention is not dependent upon the operation of any specific obstruction detection device.

The present invention provides an inexpensive, relatively simple circuit that can be easily added to existing door operators to provide assurance that the door operator will operate safely if there is any problem connecting the door operator to any type of obstruction detection device. The circuit is highly reliable, and can be adopted to most door operator systems.

These and other advantages are achieved by the present invention of a door operator system. The system comprises control means for controlling the opening and closing of a door across a doorway, means for sensing the presence of an obstruction in the doorway and for providing an "unsafe" signal in response to the presence of the obstruction, means connecting the control means and the sensing means, and means for detecting a error in the connecting means and for causing an "unsafe" signal to be sent to the control means in response to the error.

In accordance with the present invention, a door operation control system is provided, comprising drive means for moving a door between open and closed positions, control means for selectively operating the drive means to move the door between the open and closed positions, obstruction detection means for detecting an obstruction in the path of the door between the open and closed positions and for generating a signal in response thereto, means for connecting the obstruction detection means to the control means to permit operation of the drive means in the absence of a signal from the obstruction detection means and to prevent certain operations of the drive means in the presence of a signal from the obstruction detection means, and means for detecting an error in the connecting means and for generating a signal to prevent certain operations of the drive means when the errors are detected.

BRIEF DESCRIPTION OF THE DRAWINGS

FIG. 2 is a block diagram showing the relationship of the obstruction detection device to the door operator control circuit of the prior art.

FIG. 3 is a block diagram similar to FIG. 2 showing the location of the error detector circuit of the present invention.

FIG. 4 is a schematic circuit diagram showing the error detector circuit of FIG. 3 in more detail.

FIG. 5 is a schematic circuit diagram showing the location of terminating resistor when the obstruction detection device is an edge sensor system.

DETAILED DESCRIPTION OF THE PREFERRED EMBODIMENT

Figure 1:
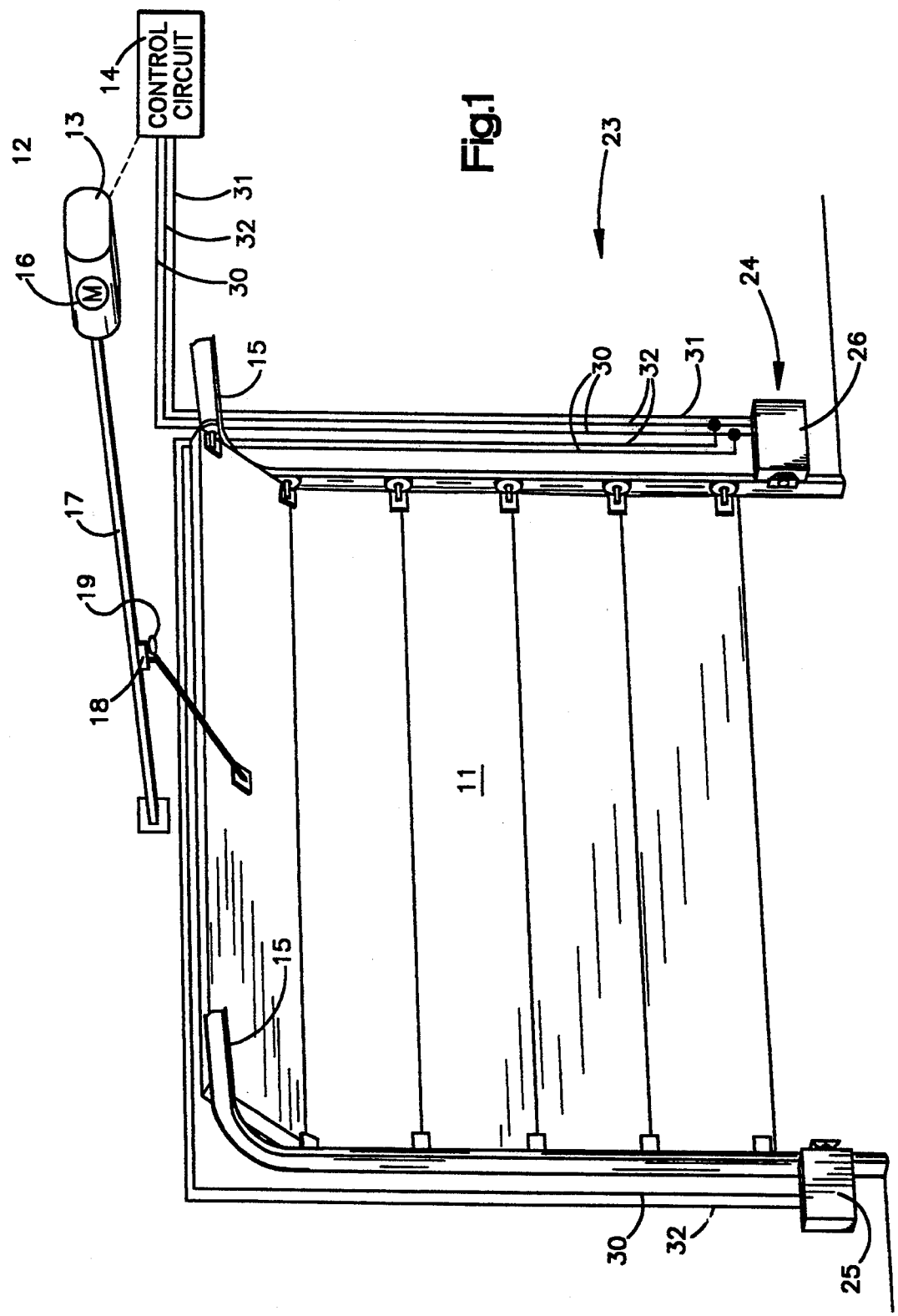
FIG. 1 is a partially schematic and partially perspective view of a garage door operator into which the present invention is incorporated.

Referring more particularly to the drawings and initially to FIG. 1, there is shown a garage door 11 which is opened and closed by a garage door opener 12 which has a door operator 13 and a control circuit 14. The garage door 11 may be any of several types. An upwardly acting garage door 11 is shown, in this case, a door made of a plurality of sections hinged together and running in a non-linear path on a curved track 15. The door operator 13 includes an electric motor 16 and a reversible drive train 17 connected between the motor and the door 11. This connection in typical garage door openers may be, for example, a chain, a tape or a rotating screw. A driven member 18 is connectable to and releasable from the drive train 17 by a handle 19, and the handle may actuate a dog into the chain or tape, or actuate a partial nut into engagement with the rotatable drive screw. Either the drive train 17 may be mechanically reversible or the motor 16 may be electrically reversible so that the door 11 may be driven in open and closing movements by the motor 16. The disconnecting handle 19 is typically provided so that should electrical power be interrupted, the handle may be disconnected and the door 11 operated manually. The control circuit 14 provides, in sequence, any one of four modes of operation: "door opening," "door stopped open," "door closing," and "door stopped closed." The usual garage door opener may also include a switch, such as a normally open, momentary closed switch like a doorbell push-button switch, and a remote radio transmitter which may be placed in an automobile, for example, to send a radio signal to a radio receiver to control the control circuit 14 for initiating at least two of these four modes of operation.

The door opener 12 illustrated in FIG. 1 also has an obstruction detection device 23 which is used to indicate the presence of an obstruction in the path of the garage door 11. The illustrated embodiment, the obstruction detection device 23 is an infrared light beam sensor system 24, although the obstruction detection device may be any other type device, such as an edge sensor system. The sensor system 24 may be of any conventional design, and the light beam sensor system shown in the drawings is typical of various available systems. The sensor system 24 shown in the drawings has a light source or emitter 25 mounted on the door frame on one side of the doorway and a receptor or sensor 26 on the door frame on the other side of the doorway. The light source 25 emits a beam of light energy, typically in the infrared spectrum, in a beam generally horizontally across the doorway, and the sensor 26 senses the light energy to indicate that the doorway is not obstructed. Preferably, the light source 25 emits an infrared beam that is pulsed, for example, at about 10 kHz, and the sensor 26 is designed to detect this pulsed beam, so that the sensor is not responsive to ordinary daylight or other artificial light sources.

In accordance with a typical prior art design as generally shown in FIG. 1 and as illustrated in the block diagram of FIG. 2, the sensor 26 is electrically connected to the door opener control circuit 14 by three wires or electrical lines: a voltage supply line 30, a return signal line 31, and a reference line or ground line 32. The voltage supply line 30 and the ground line 32 run from the control circuit 14 to the light source 25 to power the light source. All three lines 30, 31 and 32 run from the control circuit 14 to the sensor 26 to power to the sensor and to allow the sensor to provide an output signal to the control circuit 14 indicating the absence or presence of an obstruction.

As long as the sensor 26 receives light from the source 25, the sensor outputs a low-level signal on the line 31, indicating that no obstruction is detected in the doorway. In response to this low-level signal, the control circuit 14 operates the door 11 in a normal sequence, performing in order the four modes of operation of "door opening," "door stopped open," "door closing," and "door stopped closed."

If an obstruction enters the doorway, the sensor 26 no longer receives light energy from the source 25. When the sensor 26 no longer receives light energy, the sensor outputs a high-level signal on the line 31 to the door operator control circuit 14. When the control circuit 14 receives this high-level signal on line 31, the control circuit alters the normal sequence of operation depending upon which of the four modes of operation it is in. If the control circuit 14 is in the "door stopped open" mode, the control circuit inhibits any further movement of the door 11 as long as it receives the high-level signal on the line 31. If the control circuit 14 is in the "door stopped closed" mode (indicating that the door is either partially or completely closed), the control circuit has no effect on door operation, and the door 11 can be left in this position or it can be moved toward its fully open position while the high-level signal is present on the line 31. If the control circuit 14 is in the "door closing" mode, the control circuit causes the motor 16 to stop the movement of the door 11 and reverse the door movement until the door returns to the open position; the control circuit then inhibits any further movement of the door as long as it receives the high-level signal on the line 31. If the control circuit 14 is in the "door opening" mode, the control circuit allows the door 11 to continue opening while the high-level signal is present on the line 31. Thus, the control circuit 14 causes the door 11 to open if it is closing and disables further attempts to close the door until the obstruction is cleared.

However, if any of the lines are cut or damaged or crossed so that the door operator control circuit 14 is no longer properly connected to the sensor 26, the control circuit could receive an erroneous signal from the obstruction detection device 23 which is not dependent upon the presence or absence of an obstruction in the path of the door. For example, if the voltage supply line 30 and the return signal line 31 shorted together, a high-level signal would be produced on the return signal line 31 whether or not an obstruction was present. Similarly, if the ground line 32 became damaged so that this line produced an open circuit, a high-level signal could be produced on the return signal line 31 even if an obstruction was not present.

More serious problems could occur if an erroneous low-level signal was produced on the return signal line 31. For example, if the return signal line 31 and the ground line 32 shorted together, or if the voltage supply line 30 became cut or damaged to produce an open circuit, the control circuit 14 would receive a low-level signal, indicating the absence of an obstruction, even if an obstruction was present and was being sensed by the obstruction detection device 23. This condition would not be readily apparent to the user, who would continue to use the door operator under the mistaken impression that the obstruction detection device 23 was working properly and that the door operator was safe to use.

In accordance with the present invention, and as shown in FIG. 3, an error detector circuit 40 is provided between the obstruction detection device 23 and the door operator control circuit 14 to detect any of the wiring errors discussed above.

As shown in more detail in FIG. 4, the circuit 40 includes a voltage splitter formed between two resistors 41 and 42. One end of the resistor 41 is connected to the voltage supply line 30. The resistor 42 is a terminating resistor and is connected between the return signal line 31 and the ground line 32 within the obstruction detection device 23. For example, if the obstruction detection device 23 is a light beam sensor system 24 as previously described, the terminating resistor 42 is placed between the return signal line 31 and the ground line 32 at the output of the sensor 26. If the obstruction detection device is an edge sensor system 44, as shown in FIG. 5, the terminating resistor 42 may be placed in parallel with the multiplicity of open switches 44 that form the edge sensor.

The values of the resistors 41 and 42 are chosen so that the resulting intermediate voltage at the node 46 between the resistors 41 and 42 is always with a predetermined voltage range, e.g., between 3 volts and 9 volts, when the lines 30, 31 and 32 to the obstruction detection device are properly connected, when no obstruction is detected and when the supply voltage on the line 30 is within its normal range. For example, if the supply voltage is within a normal range of 20 to 30 volts, the appropriate value for the resistor 41 would be 3000 ohms and the appropriate value for the resistor 42 would be 910 ohms. These resistor values would cause the intermediate voltage to be between 4.65 volts and 7.0 volts throughout the range of supply voltages of between 20 and 30 volts. Other resistances could, or course, be chosen for other applications.

The intermediate voltage at the node 46 between the resistors 41 and 42 is connected to two Zener diodes 48 and 49. The Zener diodes 48 and 49 are chosen in accordance with the predetermined voltage range expected at the node 46. In the illustrated embodiment in which this range is between 3 volts and 9 volts, the Zener diode 48 is a 3 volt diode, and the Zener diode 49 is a 9 volt diode. As long as the intermediate voltage at the node 46 is between 3 volts and 9 volts the Zener diode 48 is on and the Zener diode 49 is off.

The Zener diode 49 is connected to the base of a transistor 51 having a common emitter connected to ground. A biasing resistor 52 is provided between the Zener diode 49 and the base of the transistor 51, and a biasing resistor 53 is provided between the base of the transistor 51 and ground. The Zener diode 48 and the collector of the transistor 51 are connected to the base of a transistor 55, which also has a common emitter connected to ground. A biasing resistor 56 is provided between the Zener diode 48 and the base of the transistor 55, and a biasing resistor 57 is provided between the base of the transistor 55 and ground. The collector of the transistor 55 provides the output of the circuit to the door operator control circuit 14 on an output line 63. The emitter of the transistor 55 is grounded, and the collector of the transistor 55 is also biased through connection to the secondary voltage supply through a biasing resistor 61. A resistor 60 is provided at the collector of the transistor 55 at the connection to the output line.

The secondary voltage supply connected to one end of the resistor 61 is typically 10 volts. Typical values for the resistors 52, 56 and 61 are 10 kilo-ohms each. Other typical values are 20 kilo-ohms each for the resistors 53 and 57 and 47 kilo-ohms for the resistor 60.

As long as the intermediate voltage at the node 46 is within the range of between 3 volts and 9 volts, the Zener diode 48 is on and the Zener diode 49 is off. Voltage is supplied to the base of the transistor 55, so the transistor 55 is turned on. The base of the transistor 51 pulled to ground, so the transistor 51 is turned off. Since the transistor 55 is on, a low-level output signal is thus produced on the output line 63.

If a wiring failure occurs, such as signal and ground lines 30 and 31 short together, or the supply and ground lines 30 and 32 short together, or an open circuit is created on the supply line 30, the intermediate voltage at the node 46 will fall below 3 volts. When this occurs, the Zener diode 48 is turned off. The Zener diode 49 remains off. With the Zener diode 48 off, the transistor 55 is controlled by the connection to the collector of the transistor 51. With the Zener diode 49 off, the transistor 51 is also off, so the transistor 55 is turned off. This causes a high-level output on the line 63.

If an obstruction is detected by the obstruction detection device, or if a wiring failure occurs, such as the supply line 30 and the signal line short together, or either the signal line or the ground line make an open circuit, the intermediate voltage at the node 46 will rise above 9 volts. When this occurs, the Zener diode 49 is turned on. The Zener diode 48 remains on. The Zener diode 49 turns on the transistor 51, pulling the base of the transistor 55 to ground, and turning the transistor 55 off. With the transistor 55 off, a high-level signal is produced on the output line 63.

While the error detector circuit 40 of the present invention has been explained with reference to a optical sensor as the obstruction detection device, it should be understood that the circuit is not dependent upon any particular device and can be used with any obstruction detection device, including any known device and most devices not yet developed. As explained above, it is apparent that the circuit 40 is compatible with edge detectors and can be used with such devices. Any other obstruction detection device can also be used as long as the appropriate terminating resistor 42 is provided in the obstruction detection device between the signal line 31 and the ground line 32.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way this is inconsistent with the extent to which the progress in the art has been advance by the invention.

What is claimed is:

1. A door operator system comprising:
    a door opener for opening and closing a door across a doorway;
    a control circuit for operating the door opener, the control circuit having an input for receiving a first signal indicating the presence of an obstruction in the doorway and a second signal indicating the absence of an obstruction in the doorway;
    an obstruction detection means for sensing obstructions in the doorway, the obstruction detection means having an output for sending a third signal indicating the presence of an obstruction and a fourth signal indicating the absence of an obstruction;
    an error detector circuit connected between the control circuit and the obstruction detection means, the error detector circuit providing the first signal on the control circuit input when the third signal is received on the obstruction detection means output, the error detector circuit providing the second signal on the control circuit input when the fourth signal is received on the obstruction detection means output, the error detector circuit and the obstruction detection means providing a splitter circuit connected to the output of the obstruction detection means for maintaining the fourth signal on the obstruction detection means output within a predetermined range of signals during normal operation of the obstruction detection means, the error detector circuit including a signal sensing circuit for sensing if the signal received on the obstruction detection means output is outside the predetermined range and for providing a first signal on the control circuit input when the signal on the obstruction detection means output is outside the predetermined range, whereby a short circuit or an open circuit in the obstruction detection means output results in the first signal on the control circuit input.

2. The door operator system as defined in claim 1, wherein the third signal comprises a first voltage level, and the fourth signal comprises a second voltage level, and wherein the signal sensing circuit comprises a voltage level detector for detecting whether the voltage on the obstruction detection means output is above or below a predetermined range of voltages.

3. The door operator system as defined in claim 1, wherein the control circuit and the obstruction detection means are also connected to a reference signal, the reference signal being outside the predetermined range of signals.

4. The door operator system as defined in claim 3, wherein the reference signal comprises a ground, the third signal comprises a first voltage level substantially spaced from the ground level, and the fourth signal comprises a second voltage level substantially spaced from the ground level, the first and second voltage levels being within a predetermined voltage range, the ground level being outside the predetermined voltage range, the signal sensing circuit detecting whether the voltage on the obstruction detection means output is above or below a predetermined range of voltages, whereby the signal sensing circuit detects a ground level voltage signal on the obstruction detection means output.

5. The door operator system as defined in claim 1, wherein the control circuit is also connected to a supply signal, the supply signal being outside the predetermined range of signals.

6. The door operator system as defined in claim 5, wherein the supply signal comprises a supply voltage level, the third signal comprises a first voltage level substantially spaced from the supply voltage level, and the fourth signal comprises a second voltage level substantially spaced from the supply voltage level, the first and second voltage levels being within a predetermined voltage range, the supply voltage level being outside the predetermined voltage range, the signal sensing circuit detecting whether the voltage on the obstruction detection means output is above or below a predetermined range of voltages, whereby the signal sensing circuit detects a short on the obstruction detection means output between the obstruction detection means output and the supply voltage level.

7. The door operator system as defined in claim 1, wherein the control circuit in response to the first signal at the input operates the door opener to open the door if the door is closing and operates the door to remain open if the door is open.

8. The door operator system as defined in claim 1, wherein the control circuit alters operation of the door opener in response to the first signal at the input.

9. The door operator system as defined in claim 8, wherein the control circuit alters operation of the door if the door is closing by stopping the closing of the door and by reversing the movement of the door.

* * * * *